United States Patent [19]
Chatterji et al.

[11] Patent Number: 6,012,524
[45] Date of Patent: Jan. 11, 2000

[54] REMEDIAL WELL BORE SEALING METHODS AND COMPOSITIONS

[75] Inventors: Jiten Chatterji; David D. Onan, both of Duncan; Roger S. Cromwell, Walters, all of Okla.

[73] Assignee: Halliburton Energy Services, Inc., Duncan, Okla.

[21] Appl. No.: 09/060,535

[22] Filed: Apr. 14, 1998

[51] Int. Cl.$^7$ ............................... E21B 33/13; E02D 3/12
[52] U.S. Cl. ..................... 166/295; 166/300; 405/264; 523/130
[58] Field of Search ................ 166/72, 295, 300; 405/264; 523/130, 131, 132; 507/119

[56] References Cited

U.S. PATENT DOCUMENTS

| | | | |
|---|---|---|---|
| 2,815,079 | 12/1957 | Goins, Jr. et al. | |
| 3,082,823 | 3/1963 | Hower . | |
| 3,208,525 | 9/1965 | Caldwell et al. . | |
| 3,310,111 | 3/1967 | Pavlich et al. . | |
| 3,416,604 | 12/1968 | Rensvold . | |
| 3,467,208 | 9/1969 | Kelly | 175/72 |
| 3,750,768 | 8/1973 | Suman, Jr. et al. | 175/72 |
| 3,782,466 | 1/1974 | Lawson et al. . | |
| 3,894,977 | 7/1975 | Brown et al. . | |
| 3,933,204 | 1/1976 | Knapp | 166/295 |
| 3,960,801 | 6/1976 | Cole et al. | 260/33.6 EP |
| 3,976,135 | 8/1976 | Anderson | 166/276 |
| 4,042,031 | 8/1977 | Knapp | 166/276 |
| 4,042,032 | 8/1977 | Anderson et al. | 166/276 |
| 4,072,194 | 2/1978 | Cole | 166/295 |
| 4,101,474 | 7/1978 | Copeland et al. | 260/13 |
| 4,113,015 | 9/1978 | Meijs | 166/295 |
| 4,199,484 | 4/1980 | Murphey . | |
| 4,215,001 | 7/1980 | Elphingstone et al. . | |
| 4,216,829 | 8/1980 | Murphey | 166/276 |
| 4,220,566 | 9/1980 | Constien et al. . | |
| 4,272,384 | 6/1981 | Martin . | |
| 4,336,842 | 6/1982 | Graham et al. | 166/276 |
| 4,483,888 | 11/1984 | Wu | 427/336 |
| 4,489,785 | 12/1984 | Cole | 166/295 |
| 4,665,988 | 5/1987 | Murphey et al. | 166/295 |
| 4,741,401 | 5/1988 | Walles et al. | 166/300 |
| 4,773,482 | 9/1988 | Allison | 166/270 |
| 4,785,884 | 11/1988 | Armbruster | 166/280 |
| 4,829,100 | 5/1989 | Murphey et al. | 523/131 |
| 4,921,047 | 5/1990 | Summers et al. | 166/276 |
| 4,972,906 | 11/1990 | McDaniel | 166/276 |
| 5,095,987 | 3/1992 | Weaver et al. | 166/276 |
| 5,133,409 | 7/1992 | Bour et al. | 166/293 |
| 5,159,980 | 11/1992 | Onan et al. | 166/294 |
| 5,168,928 | 12/1992 | Terry et al. | 166/292 |
| 5,213,161 | 5/1993 | King et al. | 166/293 |
| 5,232,961 | 8/1993 | Murphey et al. | 523/414 |
| 5,293,938 | 3/1994 | Onan et al. | 166/293 |
| 5,314,023 | 5/1994 | Dartez et al. | 166/295 |
| 5,325,723 | 7/1994 | Meadows et al. | 73/794 |
| 5,335,726 | 8/1994 | Rodrigues | 166/295 |
| 5,337,824 | 8/1994 | Cowan | 166/293 |
| 5,358,044 | 10/1994 | Hale et al. | 166/293 |
| 5,358,051 | 10/1994 | Rodrigues | 166/295 |
| 5,361,841 | 11/1994 | Hale et al. | 166/293 |
| 5,361,842 | 11/1994 | Hale et al. | 166/293 |
| 5,368,102 | 11/1994 | Dewprashad et al. | 166/276 |
| 5,373,901 | 12/1994 | Norman et al. | 166/300 |
| 5,377,757 | 1/1995 | Ng | 166/277 |
| 5,428,178 | 6/1995 | Zuzich et al. | 549/378 |
| 5,458,195 | 10/1995 | Totten et al. | 166/293 |
| 5,547,027 | 8/1996 | Chan et al. | 166/295 |
| 5,559,086 | 9/1996 | Dewprashad et al. | 507/219 |
| 5,692,566 | 12/1997 | Surles | 166/295 |
| 5,873,413 | 2/1999 | Chatterji et al. | 166/293 |
| 5,875,844 | 3/1999 | Chatterji et al. | 166/293 |
| 5,875,845 | 3/1999 | Chatterji et al. | 166/293 |
| 5,875,846 | 3/1999 | Chatterji et al. | 166/293 |
| 5,911,282 | 6/1999 | Onan et al. | 175/75 |

FOREIGN PATENT DOCUMENTS

| | | |
|---|---|---|
| 0 553 566 A1 | 8/1993 | European Pat. Off. . |
| 0 802 253 | 10/1997 | European Pat. Off. . |
| 1.315.462 | 12/1962 | France . |
| 1315462 | 12/1962 | France . |
| 1019122 | 2/1966 | United Kingdom . |
| WO 91/02703 | 7/1991 | WIPO . |
| WO 94/12445 | 9/1994 | WIPO . |

*Primary Examiner*—David Bagnell
*Assistant Examiner*—Jennifer R. Dougherty
*Attorney, Agent, or Firm*—Craig W. Roddy; C. Clark Dougherty, Jr.

[57] ABSTRACT

The present invention relates to improved methods and compositions for sealing subterranean zones penetrated by well bores to reduce their permeabilities and increase their compressive strengths. The methods basically comprise the steps of introducing an aqueous sealing composition into a subterranean zone comprising a polymerizable monomer, a polymerization initiator, a hardenable epoxide containing liquid and a hardening agent, placing the sealing composition by way of the well bore into the subterranean zone and allowing the sealing composition to polymerize and harden whereby the well bore is sealed.

21 Claims, No Drawings

REMEDIAL WELL BORE SEALING METHODS AND COMPOSITIONS

BACKGROUND OF THE INVENTION

1. Field of the Invention

The present invention relates generally to remedial well bore sealing methods and compositions, and more particularly, to improved methods and compositions for sealing subterranean zones whereby their permeabilities are reduced and their strengths are increased.

2. Description of the Prior Art

In the drilling of oil and gas wells using the rotary drilling method, drilling fluid is circulated through the drill string and drill bit and back to the surface by way of the well bore being drilled. The drilling fluid maintains hydrostatic pressure on the subterranean zones through which the well bore is drilled and circulates cuttings out of the well bore. The drilling fluid includes gelled and particulate material which builds up on the walls of the well bore and prevents fluid loss into subterranean zones penetrated by the well bore. However, relatively large openings such as channels, fractures, vugs and the like are often encountered which communicate the well bore with one or more high permeable subterranean zones. Because of the size of such openings filter cake from the drilling fluid does not seal the openings and drilling fluid is lost from the well bore into the subterranean zones. This in turn causes drilling fluid circulation to be lost whereby the drilling operations must be terminated while remedial steps are taken to seal the subterranean zones. Highly permeable subterranean zones which produce water or other undesirable fluids into the well bore are also often encountered which must be sealed.

Heretofore, a variety of methods and sealing compositions have been developed and used for combating drilling fluid lost circulation problems and problems relating to formation fluids flowing into the well bore. However, such methods and compositions have often been unsuccessful due to inadequate viscosity development by the sealing compositions used. Also, the methods of placement of the sealing compositions have been inadequate to cause plugging of the weak highly permeable portions of the zones being treated and to prevent bypassing of such portions by the sealing compositions and/or the wash-out of the compositions.

After a well bore penetrating a subterranean hydrocarbon producing formation has been drilled, the well bore is often completed by sealing a string of pipe such as casing or a liner in the well bore. That is, a sealing composition such as a hydraulic cement slurry is pumped into the annular space between the walls of the well bore and the exterior of the string of pipe disposed therein. The cement slurry is permitted to set in the annular space thereby forming an annular sheath of hardened substantially impermeable cement therein. The cement sheath physically supports and positions the pipe in the well bore and bonds the pipe to the walls of the well bore whereby the undesirable migration of fluids between zones or formations penetrated by the well bore is prevented.

The cement compositions utilized in cementing pipe strings in well bores must often be lightweight to prevent excessive hydrostatic pressures from being exerted on weak permeable zones penetrated by the well bores. In some applications, the heretofore utilized lightweight cement compositions have still had densities such that the cement compositions can not be displaced into well annuluses all the way to the surface due to the hydrostatic pressure of the cement compositions exceeding the fracture gradient of one or more of the weak permeable zones penetrated by the well bores. The resulting upper unsupported portion of the casing can and often does experience early damage due to formation cave-ins, subsidence and the like.

Thus, there is a continuing need for improved methods and sealing compositions for sealing highly permeable subterranean zones through which fluids undesirably flow into or out of the well bores penetrating the zones and for simultaneously increasing the mechanical strengths of the zones.

SUMMARY OF THE INVENTION

The present invention provides improved methods and compositions for sealing a subterranean zone penetrated by a well bore into which fluids contained in the well bore are lost or from which fluids undesirably flow into the well bore. Simultaneously, the mechanical strength of the zone is increased whereby a higher hydrostatic pressure can be utilized in the well bore without fracturing the zone.

The compositions of this invention are low viscosity, polymeric epoxide compositions which form resilient high strength impermeable sealing masses. A polymeric epoxide composition of this invention is basically comprised of water, a polymerizable monomer, an effective amount of a polymerization initiator, a hardenable epoxide containing liquid and a hardening agent. The composition can also include a particulate filler to impart a desired density and rigidity thereto.

The methods of this invention basically comprise the steps of introducing a polymeric epoxide composition of the invention into a subterranean zone penetrated by a well bore into which fluids contained in the well bore are lost or from which fluids undesirably flow into the well bore, and then causing the composition to polymerize and harden in the zone.

It is, therefore, a general object of the present invention to provide improved remedial well bore sealing methods and compositions.

Other and further objects, features and advantages of the present invention will be readily apparent to those skilled in the art upon a reading of the description of preferred embodiments which follows.

DESCRIPTION OF PREFERRED EMBODIMENTS

The present invention provides methods and polymeric epoxide sealing compositions for sealing a subterranean zone penetrated by a well bore and simultaneously improving the mechanical strength of the zone. A polymeric epoxide composition of this invention is basically comprised of a polymerizable monomer, a polymerization initiator, an epoxide containing liquid and a hardening agent. A particulate solid filler material is preferably added to the composition to impart a desired density and/or degree of rigidity thereto.

A variety of polymerizable monomers can be utilized in the polymeric epoxide compositions. Examples of such monomers include acrylic acid, methacrylic acid, acrylamide, methacrylamide, 2-methacrylamido-2-methyl propane sulfonic acid, 2-acrylamido-2-methyl propane sulfonic acid, N-N-dimethylacrylamide, vinyl sulfonic acid, N,N-dimethylamino-ethylmethacrylate, 2-triethylammoniumethyl methacrylate chloride, N,N-dimethylaminopropylmethacrylamide, methacrylamide, methacrylamidopropyl trimethylammonium chloride, N-vinyl pyrrolidone, vinylphosphonic acid, methacryloyloxyethyl trimethylammonium sulfate and mixtures thereof.

Additional more preferred monomers include hydroxyethylacrylate, hydroxymethylacrylate, hydroxyethylmethacrylate, N-hydroxymethylacrylamide, N-hydroxymethylmethacrylamide, polyethylene and polypropylene glycol acrylate and methacrylate and mixtures thereof. Of the various monomers that can be used, hydroxyethylacrylate is most preferred.

The monomer or monomers are generally present in the composition in an amount in the range of from about 10% to about 90% by weight of the composition.

While various polymerization initiators can be used, azo polymerization initiators defined by the following formula are preferred:

$$R_1\text{—}N\text{=}N\text{—}R_2$$

wherein:

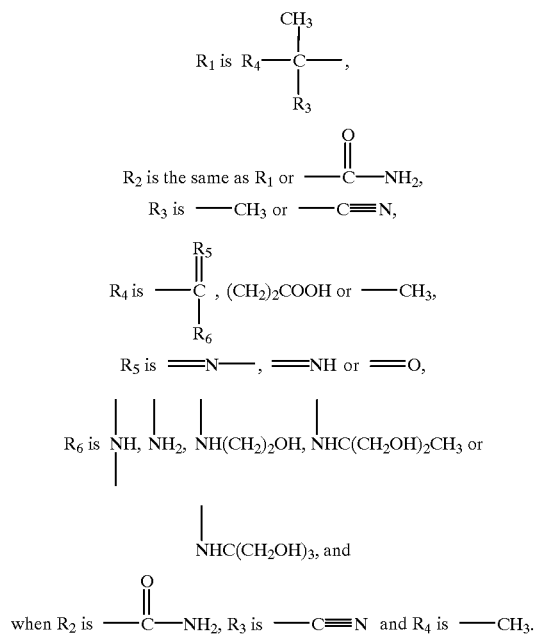

Azo polymerization initiators within the scope of the above formula are temperature activated at various temperatures and are not activated by oxidation-reduction mechanisms. The term "activation temperature" is used herein to mean that temperature at which half the molar amount of a compound converts to free radicals in a period of 10 hours.

As is understood by those skilled in the art, a particular azo polymerization initiator can be selected for use in a polymeric epoxide composition of this invention which has an activation temperature equal to or slightly less than the temperature of the subterranean zone to be sealed. Further, since the azo compounds are not activated by oxidation-reduction mechanisms, the reducing metals commonly encountered in pumping equipment and tubular goods of wells do not cause premature gelation of the composition.

The azo polymerization initiators which are generally useful in accordance with this invention have activation temperatures ranging from about 111° F. to about 190° F. Examples of preferred such azo compounds are 2,2'-azobis (N,N'-dimethylene isobutyramidine) dihydrochloride, 2,2'-azobis (2-amidinopropane) dihydrochloride, and 2,2'-azobis [2-methyl-N-(2-hydroxyethyl) propionamide]. The activation temperatures of these initiators are 111° F., 133° F. and 187° F., respectively. The quantity of the azo initiator employed is generally an amount in the range of from about 0.01% to about 2% by weight of monomer in the composition.

The azo initiator utilized is dissolved in a small amount of water and the resulting solution is added to the composition.

The polymeric epoxide sealing compositions of this invention must have low viscosities whereby they readily flow into the pores of permeable subterranean zones. Generally, the sealing compositions have a selected viscosity in the range of from about 10 to about 90 centipoises. While various low viscosity epoxide containing liquids can be used in the compositions, preferred such liquids are selected from the group of diglycidyl ethers of 1,4-butanediol, neopentyl glycol and cyclohexane dimethanol. A suitable epoxide containing liquid comprised of the diglycidyl ether of 1,4-butanediol is commercially available from the Shell Chemical Company of Houston, Tex. under the trade name "HELOXY®67". This epoxide containing liquid has a viscosity at 25° C. in the range of from about 13 to about 18 centipoises, a molecular weight of 202 and a one gram equivalent of epoxide per about 120 to about 130 grams of the liquid. A suitable diglycidyl ether of neopentyl glycol is commercially available from Shell Chemical Company under the trade name "HELOXY®68". This epoxide containing liquid has a viscosity at 25° C. in the range of from about 13 to about 18 centipoises, a molecular weight of 216 and a one gram equivalent of epoxide per about 130 to about 140 grams of the liquid. A suitable diglycidyl ether of cyclohexanedimethanol is commercially available from Shell Chemical under the trade name "HELOXY®107". This epoxide containing liquid has a viscosity at 25° C. in the range of from about 55 to about 75 centipoises, a molecular weight of 256 and a one gram equivalent of epoxide per about 155 to about 165 grams of the liquid. The epoxide containing liquid utilized is generally included in the polymeric epoxide composition in an amount in the range of from about 10% to about 90% by weight of the composition.

A variety of hardening agents, including, but not limited to, aliphatic amines, aliphatic tertiary amines, aromatic amines, cycloaliphatic amines, heterocyclic amines, amido amines, polyamides, polyethylamines and carboxylic acid anhydrides can be utilized with the above described epoxide containing liquids. Of these, aliphatic amines, aromatic amines and carboxylic acid anhydrides are the most suitable.

Examples of aliphatic and aromatic amine hardening agents are triethylenetetraamine, ethylenediamine, N-cocoalkyltrimethylenediamine, isophoronediamine, N-aminoethylpiperazines, imidazoline, 1,2-diaminecyclohexane, diethyltoluenediamine and tris (dimethylaminomethylphenol). Examples of carboxylic acid anhydride hardening agents are methyltetrahydrophthalic anhydride, hexahydrophthalic anhydride, maleic anhydride, polyazelaic polyanhydride and phthalic anhydride. Of these, triethylenetetraamine, ethylenediamine, N-cocoalkyltrimethylenediamine, isophorone diamine, diethyltoluenediamine and dimethylaminomethylphenol are preferred, with isophorone diamine, diethyltoluenediamine and tris(dimethylaminomethylphenol) being the most preferred.

One or more of the above hardening agents can be utilized in a polymeric epoxide sealant composition of this invention. The hardening agent or mixture of hardening agents is generally included in the composition in an amount in the range of from about 25% to about 45% by weight of the epoxide containing liquid in the composition.

A solid filler material can be added to the polymeric epoxide compositions to provide a desired density and/or degree of rigidity to the compositions after they have polymerized and hardened. While a variety of filler materials which are well known to those skilled in the art can be utilized, preferred filler materials are ultra fine crystalline silica having an average particle size of about 5 microns, barite, clays, solid materials which hydrate in the presence of water such as hydraulic cements and pozzolan materials, and mixtures of such filler materials. Generally, the filler material used is added to the polymeric epoxide composition of this invention in an amount in the range of from about 100% to about 300% by weight of the composition.

Upon polymerization of the monomer or monomers used and hardening of the epoxide liquid or liquids used, the polymeric epoxide compositions are highly resilient and seal as well as improve the mechanical strengths of subterranean zones containing them. The components of the compositions can be varied in kind and amount to obtain desired properties such as density, durability, degree of rigidity etc. In addition, the polymeric epoxide compositions are highly adhesive whereby they readily bond to the surfaces of subterranean formation materials.

The methods of this invention for sealing a well bore penetrating a subterranean zone into which fluids contained in the well bore are lost or from which fluids undesirably flow into the well bore and for simultaneously improving the mechanical strength of the zone are comprised of the following steps. A polymerizable and hardenable polymeric epoxide composition of this invention having a selected viscosity at 25° C. in the range of from about 10 to about 90 centipoises is prepared comprised of a polymerizable monomer, a polymerization initiator, an epoxide containing liquid and a hardening agent. After the polymeric epoxide composition is prepared, it is placed by way of the well bore into the subterranean zone to be sealed. Thereafter, the polymeric epoxide composition is allowed to polymerize and harden to thereby seal the well bore and strengthen the subterranean zone.

As will now be understood, the polymerization of the monomer or monomers in the polymeric epoxide composition and the hardening of the epoxide liquid or liquids therein, are delayed for desired periods of time to allow extended penetration of the composition into the subterranean zone to be sealed. As mentioned, in addition to sealing the subterranean zone, the mechanical strength of the zone is increased whereby higher density fluids can be utilized in the well bore without fracturing the zone. Finally, the polymeric epoxide compositions of this invention are much less expensive than hardenable epoxy compositions which have been utilized heretofore.

In order to further illustrate the methods and compositions of this invention, the following examples are given.

EXAMPLE 1

A mixture of a hydroxyethylacrylate polymerizable monomer, a 2,2'-azobis (2-amidinopropane) dihydrochloride polymerization initiator dissolved in a small amount of water, an epoxide containing liquid comprised of the diglycidyl ether of 1,4-butanediol and a diethyltoluenediamine hardening agent was prepared. The mixture contained a 1:1 ratio of the polymerizable monomer and the epoxide containing liquid. The mixture also included microsand (powdered crystalline silica) added thereto in an amount of 150% by weight of the mixture. The mixture was allowed to cure at 140° F. for 72 hours.

A second mixture containing only hydroxyethylacrylate, 2,2'-azobis (2-amidinopropane) dihydrochloride dissolved in a small amount of water and microsand added thereto in an amount of 150% by weight of the mixture was prepared. This mixture was also allowed to cure at 140° F. for 72 hours.

A third mixture containing only an epoxide containing liquid comprised of the diglycidyl ether of 1,4-butanediol, a diethyltoluenediamine hardening agent and microsand added to the mixture in an amount of 150% by weight of the mixture was prepared and allowed to cure at 140° F. for 72 hours.

The three cured mixtures were tested for compressive strength in accordance with the test procedures set forth in *API Specification for Materials and Testing for Well Cements*, API Specification 10, 5th ed., Jul. 1, 1990. The results of these tests are set forth in Table I below.

TABLE I

COMPRESSIVE STRENGTH TESTS

| Sample No | Monomer[1], % by weight of the composition | Polymerization Initiator[2] by weight of monomer in the composition | Epoxide[3] containing liquid, % by weight of the composition | Hardening[4] agent, by weight of epoxide containing liquid in the composition | Microsand, % by weight of the composition | Compressive Strength, psi |
|---|---|---|---|---|---|---|
| 1 | 50 | 0.25 | 50 | 33 | 150 | 2010 |
| 2 | 100 | 0.5 | — | — | 150 | 433 |
| 3 | — | — | 100 | 33 | 150 | 10,300 |

[1]Hydroxyethylacrylate
[2]2,2'-azobis(2-amidinopropane)dihydrochloride
[3]The diglycidyl ether of 1,4-butanediol
[4]Diethyltoluenediamine From Table I it can be seen that after polymerizing and hardening, the composition of this invention had good compressive strength.

EXAMPLE 2

A 1.75 inch diameter×2 inch long core was cut from Berea sandstone having a permeability of approximately 200 millidarcies, a compressive strength of 12,613 psi (at a confined pressure of 1,000 psi) and a tensile strength of 309 psi. The core was dried in a vacuum oven, and the outer cylinderical surface of the core was coated with an impermeable epoxy coating. After the epoxy coating had hardened and been dried in a vacuum oven for 24 hours, the core was placed in a standard API static fluid loss cell having a length of 5 inches. The cell was filled with a polymeric epoxide sealing composition of this invention and sealed. A pressure of 1,000 psi of nitrogen was applied to the cell and 10 milliliters of filtrate from the core was collected. A 1,000 psi pressure and a curing temperature of 140° F. was then applied to the cell for 72 hours after which the cured core was removed from the cell. The cured core was then cored to obtain a 1 inch diameter by 2 inches long sample which was used to determine the air permeability, compressive strength and tensile strength of the cured core.

The test process was repeated utilizing a polymeric composition which did not include an epoxide containing liquid or hardening agent. The results of these tests are given in Table II below.

TABLE II

PERMEABILITY AND OTHER TESTS

| Sample No. | Composition Components | | | | Air Permeability, md | Compressive Strength, psi | Tensile Strength, psi | Poisson's Ratio | Young's Modulus × 10$^6$, psi |
|---|---|---|---|---|---|---|---|---|---|
| | Monomer[1], % by weight of the composition | Polymerization Initiator[2], % by weight of monomer in the composition | Epoxide[3] Containing Liquid, % by weight of the composition | Hardening[4] agent, % by weight of epoxide containing liquid in the composition | | | | | |
| Untreated Core | — | — | — | — | 226.19 | 12,613 | 309 | 0.242339 | 1.680 |
| 1 | 50 | 0.25 | 50 | 33 | 0.03 | 15,919 | 855 | 0.245023 | 1.897 |
| 2 | 100 | 0.5 | — | — | 9.5 | 13,398 | 490 | 0.134152 | 1.339 |

[1]Hydroxyethylacrylate
[2]2,2'-azobis(2-amidinopropane)dihydrochloride
[3]The diglycidyl ether of 1,4-butanediol
[4]Diethyltoluenediamine From Table II it can be seen that the polymeric epoxide composition of this invention decreased the permeability of the core sample to near zero and increased the compressive and tensile strength of the sample.

Thus, the present invention is well adapted to carry out the objects and attain the features and advantages mentioned as well as those which are inherent therein. While numerous changes may be made by those skilled in the art, such changes are encompassed within the spirit of this invention as defined by the appended claims.

What is claimed is:

1. A method of sealing a subterranean zone penetrated by a well bore and simultaneously improving the mechanical strength of the zone comprising the steps of:
    introducing a polymeric epoxide composition into said zone which forms an impermeable sealing mass therein, said composition comprising a polymerizable monomer, a polymerization initiator, a hardenable epoxide containing liquid and a hardening agent; and then
    allowing said monomer to polymerize and said epoxide liquid to harden.

2. The method of claim 1 wherein said monomer in said composition is selected from the group of hydroxyethylacrylate, hydroxymethylacrylate, hydroxyethylmethacrylate, N-hydroxymethylacrylamide, N-hydroxymethylmethacrylamide, polyethylene and polypropylene glycol acrylate and methacrylate and mixtures thereof and is present in said composition in an amount in the range of from about 10% to about 90% by weight of said composition.

3. The method of claim 2 wherein said monomer in said composition comprises hydroxyethylacrylate.

4. The method of claim 1 wherein said polymerization initiator in said composition is selected from the group of 2,2'-azobis(N,N'-dimethylene isobutyramidine) dihydrochloride, 2,2'-azobis(2-amidinopropane) dihydrochloride and 2,2'-azobis[2-methyl-N-(2-hydroxyethyl) propionamide] and is present in said composition in an amount in the range of from about 0.01% to about 2% by weight of said monomer in said composition.

5. The method of claim 1 wherein said epoxide containing liquid is selected from the group of diglycidyl ethers of 1,4-butanediol, neopentyl glycol and cyclohexane dimethanol and is present in said composition in an amount in the range of from about 10% to about 90% by weight of said composition.

6. The method of claim 1 wherein said hardening agent is at least one member selected from the group of aliphatic amines, aromatic amines, and carboxylic acid anhydrides and is present in said composition in an amount in the range of from about 25% to about 45% by weight of said epoxide containing liquid in said composition.

7. The method of claim 1 wherein said hardening agent is at least one member selected from the group of triethylenetetramine, ethylenediamine, N-cocoalkyltrimethylenediamine, isphoronediamine, diethyltoluenediamine and tris(dimethylaminomethylphenol) and is present in said composition in an amount in the range of from about 25% to about 45% by weight of said epoxide containing liquid in said composition.

8. The method of claim 1 wherein said composition further comprises a particulate filler added to said composition in an amount in the range of from about 100% to about 300% by weight of said composition.

9. The method of claim 8 wherein said filler is selected from the group consisting of crystalline silicas, amorphous silicas, clays, calcium carbonate and barite.

10. A method of sealing a subterranean zone penetrated by a well bore to reduce its permeability and increase its mechanical strength comprising the steps of:
    introducing an aqueous composition into said zone which forms an impermeable sealing mass therein, said composition comprising a polymerizable monomer comprising
        hydroxyethylacrylate present in an amount in the range of from about 10% to about 90% by weight of said composition,
        a polymerization initiator comprising 2,2'-azobis(2-amidinopropane) dihydrochloride present in said composition in an amount in the range of from about 0.01% to about 2% by weight of said monomer in said composition, a hardenable epoxide containing liquid comprising the diglycidyl ether of 1,4-butanediol present in said composition in an amount in the range of from about 10% to about 90% by weight of said composition, a hardening agent comprising diethyltoleuenediamine present in said composition in an amount in the range of from about 25% to about 45% by weight of said epoxide containing liquid in said composition; and causing said monomer to polymerize and said epoxide containing liquid to harden.

11. The method of claim 10 wherein said composition further comprises a particulate filler added to said composition in an amount in the range of from about 100% to about 300% by weight of said composition.

12. A composition which forms an impermeable sealing mass for use in well remedial operations comprising:

a polymerizable monomer present in an amount in the range of from about 10% to about 90% by weight of said composition;

an effective amount of a polymerization initiator;

a hardenable epoxide containing liquid present in said composition in an amount in the range of from about 10% to about 90% by weight of said composition;

an effective amount of a hardening agent.

13. The composition of claim 12 wherein said monomer is selected from the group of hydroxyethylacrylate, hydroxymethylacrylate, hydroxyethylmethacrylate, N-hydroxymethylacrylamide, N-hydroxymethylmethacrylamide, polyethylene and polypropylene glycol acrylate and methacrylate and mixtures thereof.

14. The composition of claim 12 wherein said monomer comprises hydroxyethylacrylate.

15. The composition of claim 12 wherein said polymerization initiator is selected from the group of 2,2'-azobis(N, N'-dimethylene isobutyramidine) dihydrochloride, 2,2'-azobis(2-amidinopropane) dihydrochloride and 2,2'-azobis [2-methyl-N-(2-hydroxyethyl) propionamide].

16. The composition of claim 12 wherein said polymerization initiator is 2,2'-azobis (2-amidinopropane) dihydrochloride and is present in an amount in the range of from about 0.01% to about 2% by weight of said monomer in said composition.

17. The composition of claim 12 wherein said epoxide containing liquid is selected from the group of diglycidyl ethers of 1,4-butanediol, neopentyl glycol and cyclohexane dimethanol.

18. The composition of claim 12 wherein said hardening agent is at least one member selected from the group of triethylenetetramine, ethylenediamine, N-cocoalkyltrimethylenediamine, isophoronediamine, diethyltoluenediamine and tris(dimethylaminomethylphenol) and is present in said composition in an amount in the range of from about 25% to about 45% by weight of said epoxide containing liquid in said composition.

19. The composition of claim 18 wherein said hardening agent is diethyltoluenediamine.

20. The composition of claim 12 wherein said epoxy composition further comprises a particulate filler added to said composition in an amount in the range of from about 100% to about 300% by weight of said composition.

21. The composition of claim 20 wherein said filler is selected from the group consisting of crystalline silicas, amorphous silicas, clays, calcium carbonate and barite.

* * * * *